(12) United States Patent
Gatson et al.

(10) Patent No.: US 10,514,757 B2
(45) Date of Patent: Dec. 24, 2019

(54) WIRELESS COMMUNICATION CONFIGURATION USING MOTION VECTORS IN VIRTUAL, AUGMENTED, AND MIXED REALITY (XR) APPLICATIONS

(71) Applicant: Dell Products, L.P., Round Rock, TX (US)

(72) Inventors: Michael S. Gatson, Austin, TX (US); Thanh T. Tran, Houston, TX (US)

(73) Assignee: Dell Products, L.P., Round Rock, TX (US)

( * ) Notice: Subject to any disclaimer, the term of this patent is extended or adjusted under 35 U.S.C. 154(b) by 370 days.

(21) Appl. No.: 15/631,871

(22) Filed: Jun. 23, 2017

(65) Prior Publication Data
US 2018/0373326 A1 Dec. 27, 2018

(51) Int. Cl.
| | |
|---|---|
| G06F 15/16 | (2006.01) |
| G06F 3/01 | (2006.01) |
| H04L 29/08 | (2006.01) |
| G02B 27/01 | (2006.01) |
| G01C 11/06 | (2006.01) |
| G06F 16/954 | (2019.01) |
| G06F 1/16 | (2006.01) |
| G06F 3/038 | (2013.01) |
| H04L 29/06 | (2006.01) |

(52) U.S. Cl.
CPC ............ *G06F 3/013* (2013.01); *G01C 11/06* (2013.01); *G02B 27/0176* (2013.01); *G02B 27/0179* (2013.01); *G06F 1/163* (2013.01); *G06F 1/1698* (2013.01); *G06F 3/011* (2013.01); *G06F 3/012* (2013.01); *G06F 3/017* (2013.01); *G06F 3/038* (2013.01); *G06F 16/954* (2019.01); *H04L 67/02* (2013.01); *G06F 2203/0384* (2013.01); *H04L 67/38* (2013.01)

(58) Field of Classification Search
CPC ........ G06F 3/013; G06F 16/954; G06F 1/163; G06F 1/1698; G06F 3/011; G06F 3/012; G06F 3/017; G06F 3/038; H04L 67/02; H04L 67/38
See application file for complete search history.

(56) References Cited

U.S. PATENT DOCUMENTS

| | | | | |
|---|---|---|---|---|
| 9,767,702 | B2 * | 9/2017 | Bernhardt | G08G 5/025 |
| 10,212,534 | B2 * | 2/2019 | Luna | H04W 4/023 |
| 10,279,925 | B2 * | 5/2019 | Cole | B64D 43/00 |
| 2014/0274185 | A1 * | 9/2014 | Luna | H04W 24/08 455/517 |
| 2014/0279889 | A1 * | 9/2014 | Luna | G06F 16/27 707/626 |

(Continued)

*Primary Examiner* — Moustafa M Meky
(74) *Attorney, Agent, or Firm* — Fogarty LLP (57) ABSTRACT

Systems and methods for configuring wireless communications using motion vectors in virtual, augmented, and mixed reality (xR) applications are described. In some embodiments, an Information Handling System (IHS) may include a processor and a memory coupled to the processor, the memory having program instructions stored thereon that, upon execution by the processor, cause the IHS to: receive motion vector data representative of a direction of travel of a user wearing xR headset; and change a configuration of an antenna based upon the motion vector data, wherein the antenna enables the IHS to wirelessly transmit xR content to the xR headset.

20 Claims, 7 Drawing Sheets

(56) References Cited

U.S. PATENT DOCUMENTS

2017/0018195 A1* 1/2017 Bernhardt .............. G08G 5/025
2018/0062719 A1* 3/2018 Verma .................. H04B 7/0617
2018/0192075 A1* 7/2018 Chambers .............. H04N 19/59

* cited by examiner

WIRELESS COMMUNICATION CONFIGURATION USING MOTION VECTORS IN VIRTUAL, AUGMENTED, AND MIXED REALITY (XR) APPLICATIONS

FIELD

The present disclosure generally relates to Information Handling Systems (IHSs), and, more particularly, to systems and methods for configuring wireless communications using motion vectors in virtual, augmented, and mixed reality (collectively referred to as "xR") applications.

BACKGROUND

The goal of virtual reality (VR) is to immerse users in virtual environments. A conventional VR device obscures a user's real-world surroundings, such that only digitally-generated images remain visible. Those images are presented on a display such as, for example, an organic light-emitting diode or "OLED" panel housed within a head-mounted device (HMD) or the like.

In contrast with VR, augmented reality (AR) and mixed reality (MR) operate by overlaying digitally-generated content or entities (e.g., characters, text, hyperlinks, images, graphics, etc.) upon the user's physical surroundings. A typical AR/MR device includes a projection-based optical system that displays content on a translucent or transparent surface (e.g., plastic, glass, etc.) of an HMD, heads-up display (HUD), eyeglasses, or the like.

In modern implementations, xR headsets (i.e., VR, AR, or MR) may be wirelessly tethered to an external computer. Conventional xR headsets do not have as much processing capability than the external computer, so the external computer is used to generate the digital images to be displayed by the xR headset. The xR headset transmits information to the computer regarding the state of the user (e.g., head position, proximity to other users, etc.), which in turn enables the external computer to determine which image to show to the user next, and from which perspective, as the user moves around and/or changes head position.

The inventors hereof have recognized, however, that wireless communications between an xR headset and an external computer and require a high-bitrate continuous radio frequency (RF) signal (e.g., 5.6 Gbps). The high-bandwidth communications used in xR applications is problematic because it requires a direct line-of-sight between the xR headset and the external computer. These issues become more difficult to address when the user is allowed to move freely in a room, for example. To address these and other concerns, the inventors hereof have developed systems and methods for configuring wireless communications using motion vector data.

SUMMARY

Embodiments of systems and methods for configuring wireless communications using motion vectors are described. In an illustrative, non-limiting embodiment, a an Information Handling System (IHS) may include a processor; and a memory coupled to the processor, he memory having program instructions stored thereon that, upon execution by the processor, configure or cause the IHS to: receive motion vector data representative of a direction of travel of a user wearing a virtual, augmented, or mixed reality (xR) headset; and change a configuration of an antenna based upon the motion vector data, wherein the antenna enables the IHS to wirelessly transmit xR content to the xR headset.

Motion vector data may include a first position of a macroblock in a first frame, a second position of the macroblock in a second frame, a time interval between the second frame and the first frame, and a distance between the second and first positions. The first and second frames may be obtained, at least in part, using a camera mounted on the xR headset, and the macroblock may be identified as a subset of pixels having a contrast above or below a threshold value. Motion vector data may also include at least one of: a location, a direction of movement, a linear speed, an angular speed, a linear acceleration, or an angular acceleration of the user.

The program instructions may configure or cause the IHS to determine, using the motion vector data, that the user has reached a selected boundary within a room. The antenna may be part of an antenna array. The antenna array may be configured to provide a multi-gigabit per second speed wireless communication over a 60 GHz frequency band. And change of the configuration may include a change of a radiation pattern of the antenna array.

The antenna array may be configurable to provide a plurality of different radiation patterns, each different radiation pattern having a distinct lobe configuration. The selected boundary is disposed between two neighboring lobes. The change of the configuration may include: turning a given antenna of the antenna array on in response to the user having reached the selected boundary, or turning the given antenna off in response to the user having reached the selected boundary.

The change of the configuration may include increasing an amplification of a signal received or transmitted by an individual antenna of the antenna array in response to the user having reached the selected boundary. Additionally or alternatively, the change of the configuration may include application of different beamforming settings to the antenna array to increase a signal strength between the xR headset and the IHS in response to the user having reached the selected boundary.

Changing the configuration of the antenna may include changing a communication protocol between the IHS and the xR headset in response to the user having reached the selected boundary. Moreover, the motion vector data may be predictive of the direction of travel of the user, and the change of the configuration may be performed in anticipation of the user reaching the selected boundary.

In some cases, the change of the configuration may occurr in response to another determination that a signal strength of the transmission of the xR content is above a threshold value. The program instructions may configure or cause the IHS to determine that the change of the configuration is followed by a drop in a signal strength of the transmission of the xR content below a threshold value, and return the antenna to a previous configuration.

In another illustrative, non-limiting embodiment, a method may implement one or more of the aforementioned operations. In yet another illustrative, non-limiting embodiment, a hardware memory storage device may have program instructions stored thereon that, upon execution by an IHS, configure or cause the IHS to perform one or more of the aforementioned operations.

BRIEF DESCRIPTION OF THE DRAWINGS

The present invention(s) is/are illustrated by way of example and is/are not limited by the accompanying figures.

Elements in the figures are illustrated for simplicity and clarity, and have not necessarily been drawn to scale.

DETAILED DESCRIPTION

Embodiments described herein provide systems and methods for configuring wireless communications using motion vectors. These techniques are particularly useful in virtual, augmented, and mixed reality (collectively referred to as "xR") applications that employ head-mounted devices (HMDs), Heads-Up Displays (HUDs), eyeglasses, or the like (collectively referred to as "xR headsets" or simply "headsets").

In some implementations, a system may include one or more radio frequency (RF) antennas or antenna arrays. An initial training or mapping operation selects the best antenna configuration while the user is starting a game or other xR application, for example, without any motion. The system uses the video hardware accelerators embedded in the graphics system of an external information handling system (IHS) to detect the direction of the user's movement by deriving or monitoring motion vectors used in the rendering of xR images, and automatically switches to a different RF antenna configuration if the current configuration is providing a weak signal. Motion vectors point at the direction of the user's movement, so using this information to switch the antenna or otherwise re-configure the wireless transmission yields superior wireless performance.

In some cases, these systems and methods may also automatically switch to a different wireless standard or protocol (e.g., WiFi) if a given communication channel is lost or degraded. The xR application may continue to run at a lower quality, for example, using the video compression engine built in the graphics processor of the IHS to perform real-time compression of frame buffer data before transmitting images to the xR headset.

As such, systems and methods described herein may monitor motion video data to determine a direction or radiation pattern to switch the antenna array to yield improved RF signals. These techniques are a sharp departure from conventional antenna control methods, which simply monitor the signal strength to the communication between the IHS and the xR headset, and therefore suffer from excessive latency, especially when the user walks or moves about a room.

Figure 1A:
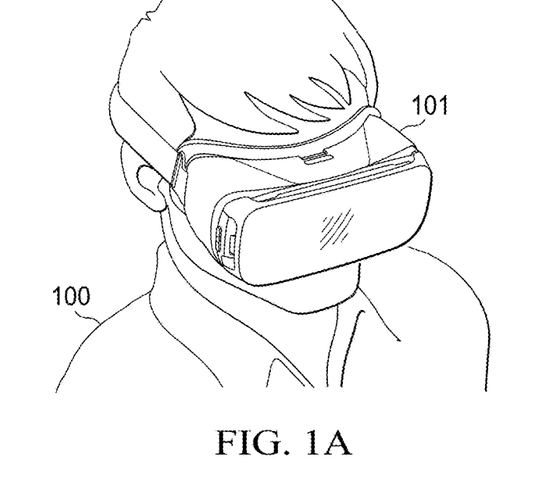
FIG. 1A and 1B illustrate a non-limiting example of a headset used in a virtual, augmented, or mixed reality (xR) application according to some embodiments.
Figure 1B:
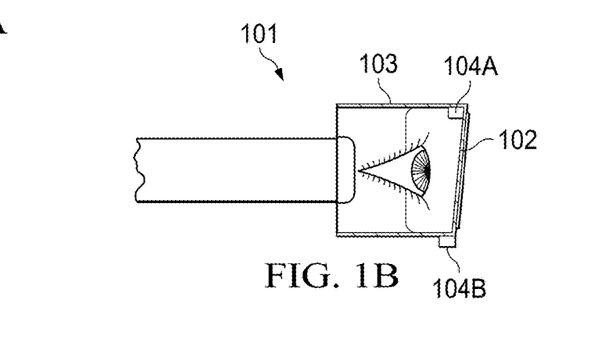

FIGS. 1A and 1B illustrate an example of an xR headset according to some embodiments. As shown, user 100 wears xR headset 101 around their heads and over their eyes. In some applications (e.g., AR and MR), user 100 may see their physical environment via a see-through display system, glass, and/or lens 102 mounted on xR headset frame or body 103. Display(s) 102 may show information in the form of digital entities (e.g., characters, text, hyperlinks, images, graphics, etc.) overlaying a visible, physical environment in the user's field of view. In some cases, these digital entities may be relevant to a physical object located within the environment. Additionally or alternatively, display(s) 102 may completely immerse the user is a purely virtual, digital environment (e.g., VR) such that, for practical purposes, the physical environment is no longer visible to the user.

Display 102 may include a liquid crystal display (LCD) display 102 with a backlight or the like. In other cases, display 102 may include one or more transparent or translucent organic light-emitting diode (OLED) displays comprising one or more flexible sheets of organic electroluminescent material. Additionally or alternatively, an optical projector device may be aimed at display 102, which may include a projection display or the like.

In some cases, a first display portion may be disposed in front of the user's right eye, and a second display portion may be disposed in front of the user's left eye. Alternatively, a single display may be used for both eyes.

In various implementations, xR headset 101 also includes sensors 104A and 104B. For example, sensors 104A and/or 104B may include cameras (e.g., IR cameras, B&W cameras, or any other type of camera), Ambient Light Sensors (ALS), and/or inertial sensors (e.g., accelerometers, etc.). In this implementation, camera 104A is inward-looking (e.g., aimed at the user's eyes), whereas camera 104B is outward-looking (e.g., aimed forward, to capture what the user sees).

Figure 2:
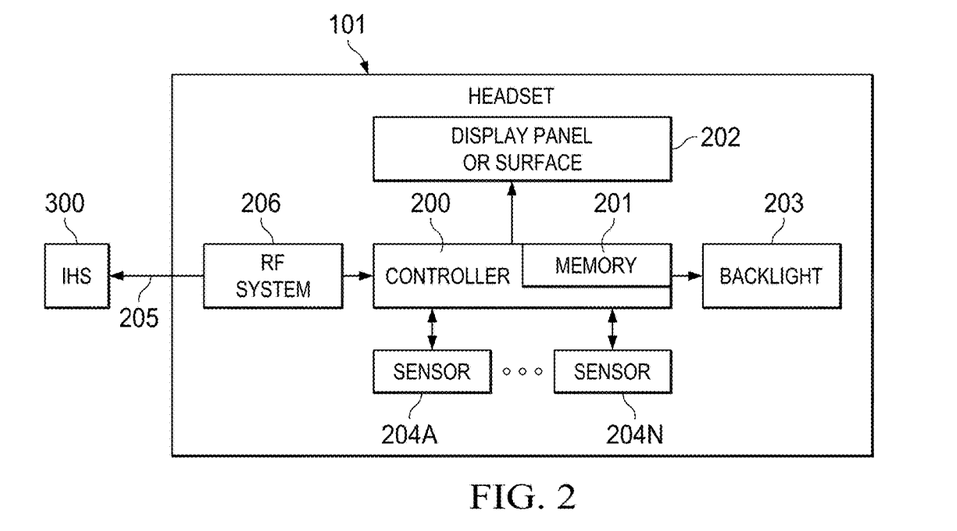
FIG. 2 is a block diagram of non-limiting examples of xR headset components according to some embodiments.

FIG. 2 is a block diagram of non-limiting examples of xR headset 101 components according to some embodiments. As depicted, controller 200 includes hardware memory storage device 201 having program instructions stored thereon that, upon execution by controller 200, cause xR headset 101 to create and/or display an all-immersive virtual environment, and/or to overlay digitally-created content or images on panel or surface 202 (e.g., an LCD panel, an OLED film, a projection surface, etc.) over the user's natural visual perception of the real-world.

As such, controller 200 drives panel or surface 202 and/or backlight 203 (e.g., an LED light) of display 102 in order to provide the user with a visual xR experience. Moreover, controller 200 may employ sensors 104-B to implement a number of tracking techniques usable in the rendering of the xR images (e.g., the user's own location, head position, etc.) for user 100, and/or to change one or more aspects of xR headset 101's display 102 and/or digitally-created content or images (e.g., relative size of other entities, perspective, field of view, etc.). Sensor control and panel control can also physically be separate controllers in other implementations.

In some implementations, controller 200 may communicate with external IHS 300 via wired or wireless connection 205 (e.g., WiGig, WiFi, etc.) using RF system 206. A non-limiting example of RF system 206 is discussed in FIG. 4 below. Although FIG. 2 shows RF system 206 fully integrated in xR headset 101, in other examples RF system 315 may be externally mounted and not fully integrated.

As a person of ordinary skill in the art will recognize in light of this disclosure, FIG. 2 shows portions of xR headset 101 that are relevant for understanding the systems and methods described herein. Yet, it should be noted that power systems and other components may also be present. In some cases, xR headset 101 may itself be an IHS, such one or more elements of IHS 300 may be built on frame or body 103 of xR headset 101.

Figure 3:
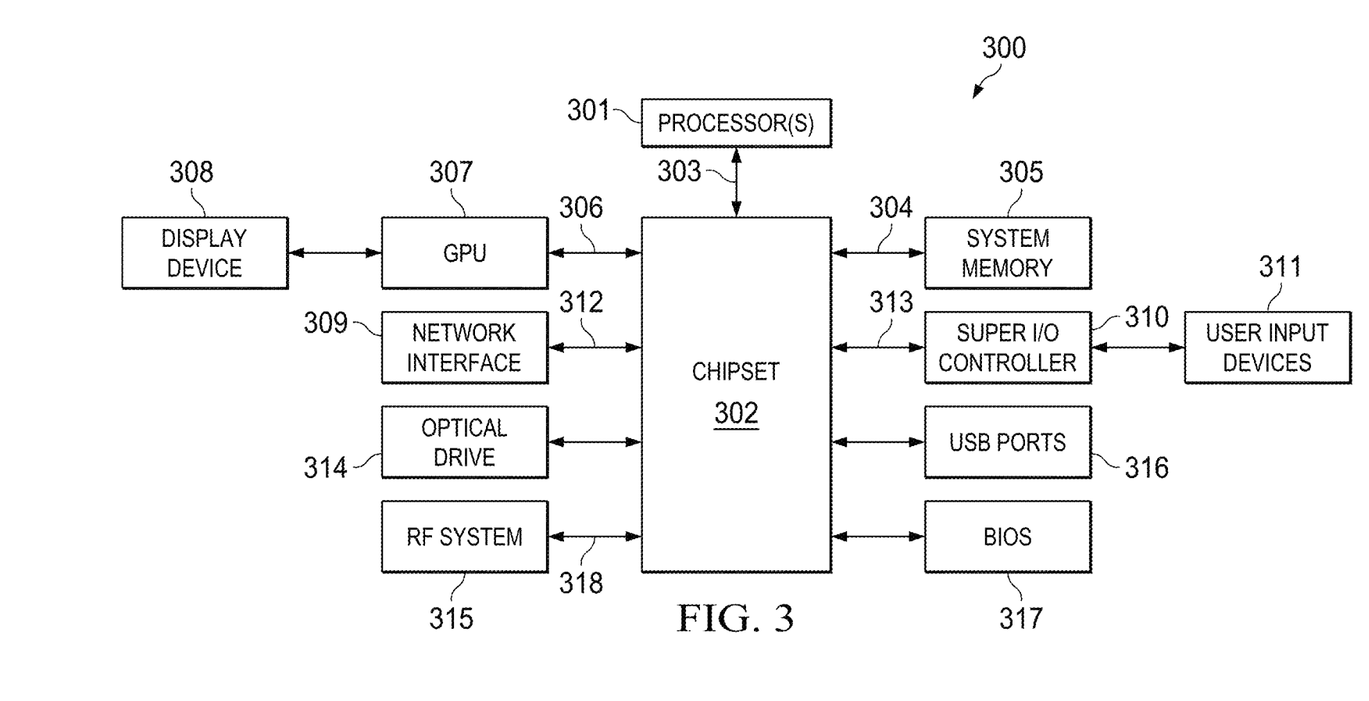
FIG. 3 is a block diagram of non-limiting examples of information handling system (IHS) components according to some embodiments.

FIG. 3 is a block diagram of non-limiting examples of Information Handling System (IHS) components according to some embodiments. In some cases, IHS 300 may be used as an external device in wired or wireless communication with xR headset 101. Additionally or alternatively, xR headset 101 may include component(s) of IHS 300.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below.

As shown in the implementation of FIG. 3, IHS 300 may include one or more processors 301. In various embodiments, IHS 300 may be a single-processor system including one processor 301, or a multi-processor system including two or more processors 301. Processor(s) 301 may include any processor capable of executing program instructions, such as any general-purpose or embedded processors implementing any of a variety of Instruction Set Architectures (ISAs).

IHS 300 includes chipset 302 that may have one or more integrated circuits that are coupled to processor(s) 301. In certain embodiments, chipset 302 may utilize a QPI (Quick-Path Interconnect) bus 303 for communicating with processor(s) 301. Chipset 302 provides processor(s) 301 with access to a variety of resources. For instance, chipset 302 provides access to system memory 305 over memory bus 304. System memory 305 may be configured to store program instructions executable by, and/or data accessible to, processors(s) 301. In various embodiments, system memory 305 may be implemented using any suitable memory technology, such as static RAM (SRAM), dynamic RAM (DRAM) or nonvolatile/Flash-type memory.

Chipset 302 may also provide access to Graphics Processing Unit (GPU) 307. In certain embodiments, graphics processor 307 may be disposed within one or more video or graphics cards that have been installed as components of the IHS 300. Graphics processor 307 may be coupled to chipset 302 via graphics bus 306 such as provided by an AGP (Accelerated Graphics Port) bus or a PCIe (Peripheral Component Interconnect Express) bus. In certain embodiments, a GPU 307 generates display data and provides it to xR headset 101 (or any other display device 308).

In certain embodiments, chipset 302 may also provide access to one or more user input devices 311. In those cases, chipset 302 may be coupled to a super I/O controller 310 that provides interfaces for a variety of user input devices 311, in particular lower bandwidth and low data rate devices. For instance, super I/O controller 310 may provide access to a keyboard and mouse or other peripheral input devices. In certain embodiments, super I/O controller 310 may be used to interface with coupled user input devices 311 such as keypads, biometric scanning devices, and voice or optical recognition devices. These I/O devices may interface with super I/O controller 310 through wired or wireless connections. In certain embodiments, chipset 302 may be coupled to super I/O controller 310 via Low Pin Count (LPC) bus 313.

Other resources may also be coupled to the processor(s) 301 of IHS 300 through chipset 302. In certain embodiments, chipset 302 may be coupled to network interface 309, such as provided by a Network Interface Controller (NIC) coupled to IHS 300. For example, network interface 309 may be coupled to chipset 302 via PCIe bus 312. According to various embodiments, network interface 309 may also support communication over various wired and/or wireless networks and protocols (e.g., WiGig, Wi-Fi, Bluetooth, etc.). In certain embodiments, chipset 302 may also provide access to one or more Universal Serial Bus (USB) ports 316.

Chipset 302 also provides access to RF system 315, similar the previously discussed RF system 206, and a non-limiting example of which is discussed in more detail in FIG. 4 below. Chipset 302 utilizes interface connection 318 in order to communicate with RF system 315.

In certain embodiments, chipset 302 may provide access to other types of storage devices. For instance, IHS 300 may utilize one or more magnetic disk storage devices, optical drives, solid state drives, or removable-media drives.

Upon powering or restarting IHS 300, processor(s) 301 may utilize instructions stored in Basic Input/Output System (BIOS) or Unified Extensible Firmware Interface (UEFI) chip or firmware 317 to initialize and test hardware components coupled to the IHS 300 and to load an Operating System (OS) for use by IHS 300. Generally speaking, BIOS 317 provides an abstraction layer that allows the OS to interface with certain hardware components that utilized by IHS 300. It is through this hardware abstraction layer that software executed by the processor(s) 301 of IHS 300 is able to interface with I/O devices that coupled to IHS 300.

In various embodiments, IHS 300 may not include each of the components shown in FIG. 3. Additionally or alternatively, IHS 300 may include various components in addition to those that are shown. Furthermore, some components that are represented as separate components in FIG. 3 may, in some embodiments, be integrated with other components. For example, in various implementations, all or a portion of the functionality provided by the illustrated components may instead be provided by components integrated into the one or more processor(s) 301 as a system-on-a-chip (SOC) or the like.

Figure 4:
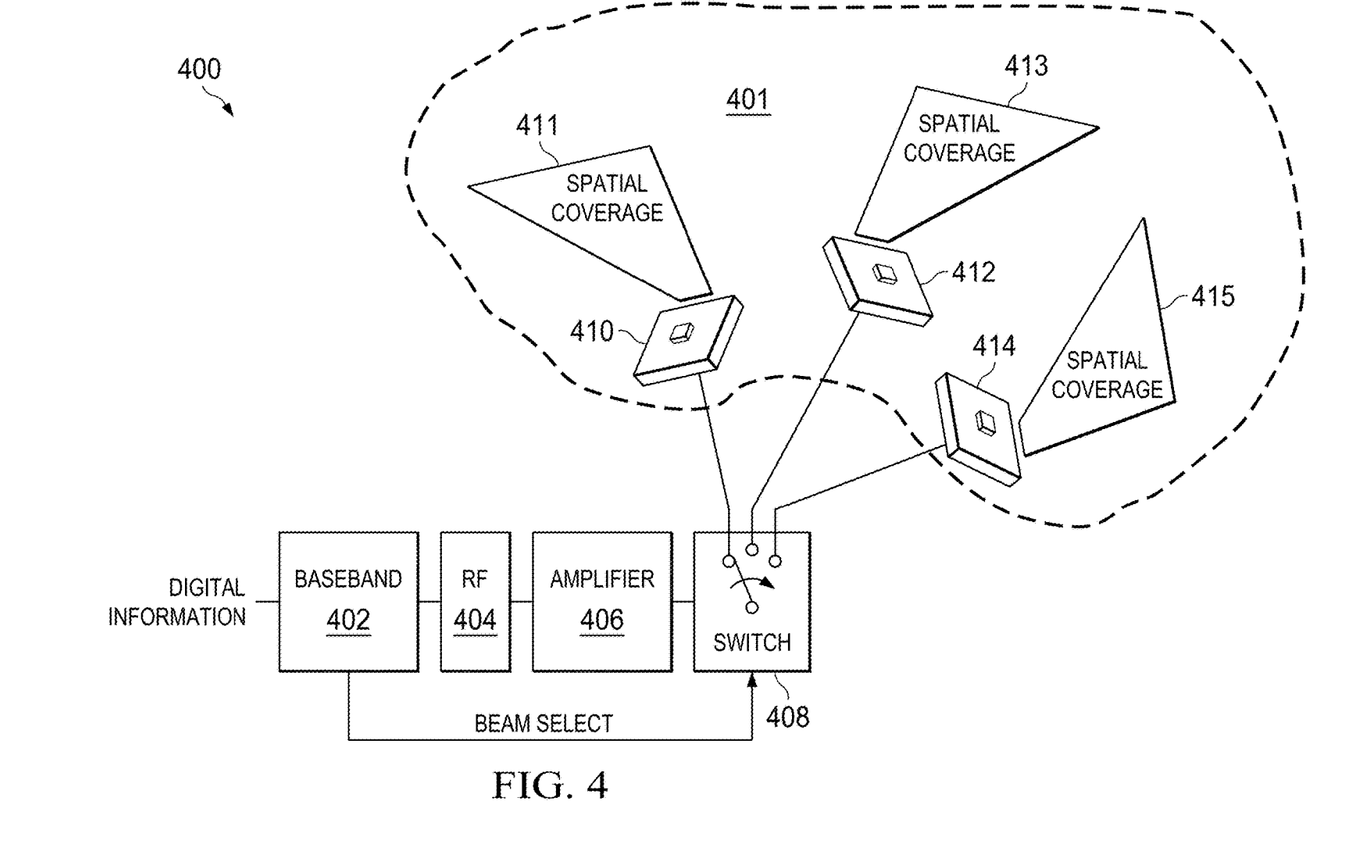
FIG. 4 is a block diagram of a non-limiting example of a radio frequency (RF) circuit according to some embodiments.

FIG. 4 is a block diagram of a non-limiting example of RF circuit 400. In various embodiments, RF circuit 400 may be used to implement RF systems 206 and/or 315 to thereby establish and maintain communication channel 205.

As shown, RF circuit 400 includes antenna array 401, baseband module 402, radio frequency module 404, amplifier 406, and switch 408. Antenna array 401 comprises individual antennas 410, 412, and 414. A representation of spatial coverage and general directivity associated with antennas 410, 412, and 414 is also illustrated as spatial coverage areas 411, 413, and 415, respectively.

In some embodiments, antennas 410, 412, and 414 may be clustered together, or individual antennas may be located in disparate locations (e.g., in different walls of a room where the xR application is ongoing). At least one of antennas 410, 412, or 414 may be oriented in a different direction relative to another antenna. In some cases, any selected individual antenna(s) may be enabled (e.g., while the remaining antennas are disabled) using switch 408, to provide selectable directivity, radiation patterns, and/or beamforming.

Baseband module 402 is configured to encode digital information for transmission by IHS 300 or to decode information that has been received by IHS 300. Baseband module 402 provides network protocol-layer functions such as packetizing of the digital data information. Baseband module 402 is further operable to configure switch 408 to select an individual one or more of antennas 410, 412, and 414 for operation.

RF module 404 and amplifier 406 modulate and amplify an RF signal (e.g., an approximately 60 GHz RF signal) to encode the baseband information and to supply the radio frequency signal to switch 408 for transmission by a selected one or more of antennas 410, 412, and 414. While operating as a receiver, a radio frequency signal received at a selected antenna is detected and demodulated by amplifier 406 and radio frequency module 404, and the information is provided to baseband module 402. Baseband module 402 further decodes the information to provide digital information to IHS 300.

Modulation methods may include, but are not limited to, orthogonal frequency-division multiplexing (OFDM), quadrature amplitude modulation (QAM), binary phase-shift keying (BPSK), and quadrature phase-shift keying (QPSK).

Switch 408 selects which of antennas 410, 412, and 414 are active by completing an electrical connection with the desired antenna(s), enabling operation of the selected antenna(s). Remaining antenna(s), if any, are consequently deselected and thus disabled. Switch 408 may include electromechanical switches, micro-electromechanical (MEM) switches, semiconductor transistor switches, PIN diodes (diodes with an intrinsic region), or another type of switch suitable for switching radio frequency signals. In some implementations, switch 408 may be controlled by baseband module 402. Baseband module 402 may select one or more of antennas 410, 412, and 414 to enable those antenna(s) to transmit or receive the radio frequency signal.

Selectable configuration settings of an antenna system, such as antenna array 401, include its directivity and gain, among other attributes. The directivity of antenna array 401 relates to the spatial coverage of antenna array 401, which in part determines the strength of received radio frequency signals based on the physical location and orientation of the transmitter antenna system and of a receiver antenna system. The spatial coverage of an antenna array 401 is further determined based on the number and type of antennas included in the antenna array 401, signal interference, loss of signal energy due to absorption, and the like.

Broadly speaking, an antenna is a resonant circuit capable of transmitting or receiving a radio frequency signal. There are many types of antennas, including monopole, dipole, patch, and others. Antenna systems can be further classified based on how signals are provided to one or more antennas, such as: beam-forming antennas, spatial multiplexing antennas, or the like.

Antenna array 401 includes two or more individual antennas 410, 412, and 414, which do not necessarily share a common orientation. An individual antenna, or set of antennas, may be selectively enabled using a switch device to control directivity characteristics. In some cases, a set of antennas may be fabricated on a single Printed Circuit Board (PCB).

In some embodiments, antenna array 401 may operate within the 60 GHz radio frequency band, for example, within a frequency range extending from approximately 57 GHz to 66 GHz. For example, a network bandwidth of approximately 4 gigabits per second (Gb/s) can be implemented that can support transfer of video information between xR headset 101 and IHS 300. In other embodiments, however, antenna array 401 may operate within other radio frequency bands, for example, from approximately 30 GHz to 200 GHz.

The spatial coverage provided by an individual antenna operating at 60 GHz can be relatively small compared to the spatial coverage that may be provided other types of antennas, such as a monopole antenna, because small antennas are highly directional. Therefore, the range of communication channel 205 that can be achieved between xR headset 101 and IHS 300 is dependent on the mutual orientation of the transmitting antenna and the receiving antenna.

Figure 5:
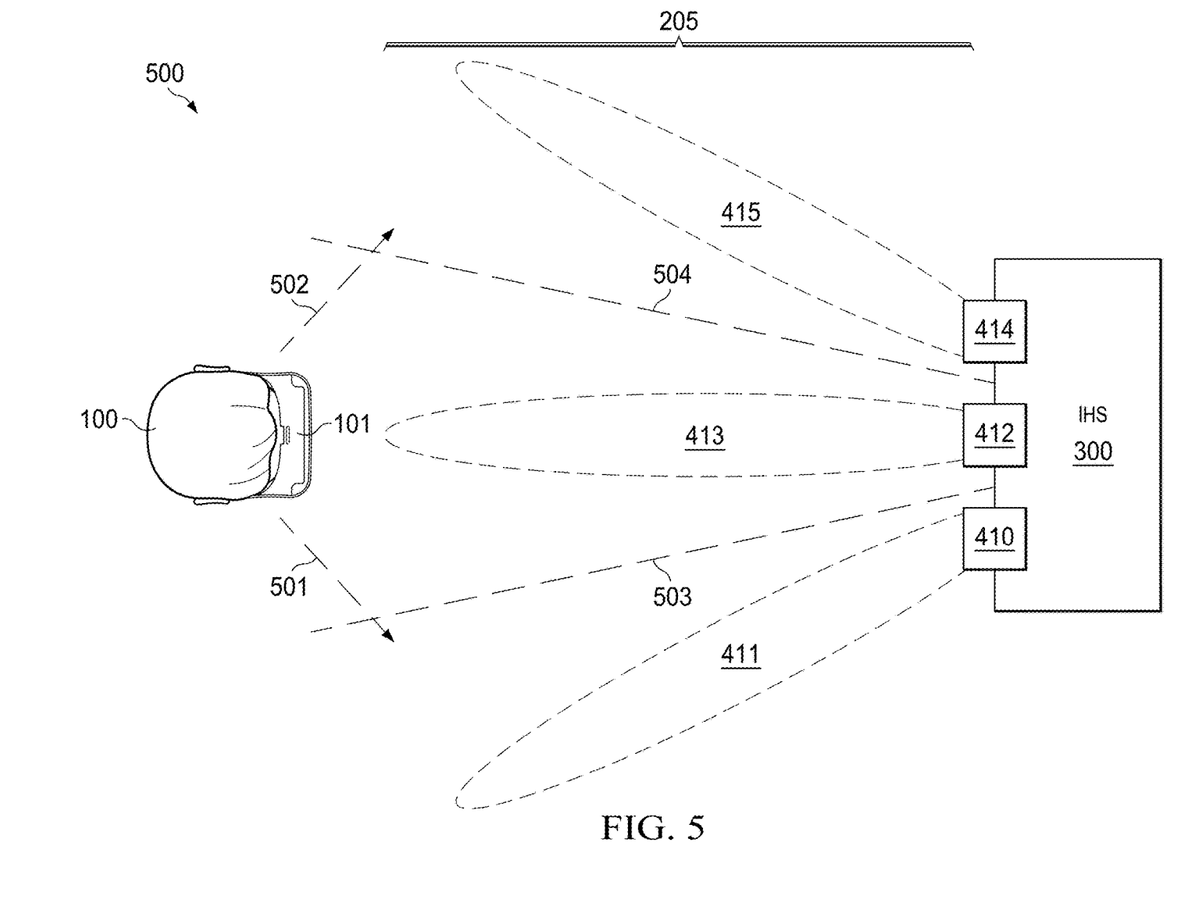
FIG. 5 is a diagram of a non-limiting example of an xR application according to some embodiments.

FIG. 5 is a diagram of a non-limiting example of an xR application according to some embodiments. As illustrated, user 100 wearing xR headset 101 is located in room 500. Headset 101 is wirelessly tethered to IHS 300 via communication channel 205, created by RF systems 206 and 315 implementing different instances of RF circuit 400. For ease of explanation, the same spatial coverage areas 411, 413, and 415 produced by antennas 410, 412, and 414 of antenna array 401 are represented individually as a respective lobe or beam. It should be noted, however, that in other sitautions, any number of antennas and/or antennas arrays may be distributed across room 500, each antenna system capable of producing a wide range of different radiation patterns and/or having different beamforming capabilities.

Using the systems and methods described herein, boundary 503 may be defined between beams 411 and 413, and boundary 504 may be defined between beams 413 and 415. As user 100 moves in direction 501 or 502 towards boundary 503 or 504, respectively, systems and methods described herein may contemporaneously and/or predictively change a configuration of antenna array 401 to enable IHS 300 to wirelessly transmit xR content to xR headset 101 an improved or optimized manner. Although three beams or lobes and two boundaries for illustration purposes, it should be noted that the number of lobes and/or boundaries used may vary depending upon the application, location of the user, interfering objects between xR headset 101 and IHS 300, etc.

In various embodiments, systems and methods described herein may increase the spatial coverage of an antenna system, such as array 401, for instance, by receiving graphical motion vector data representative of a direction of travel of user 100 wearing xR headset 101, and then changing a configuration of selected antenna(s) 410, 412 and/or 414 of antenna array 401 based upon that motion vector data.

In some cases, motion vector data may be used to predict a future position of user 100 in room 500, and to prepare array 401 to switch its configuration with reduce latency or lag. For example, embodiments described herein may determine a position, speed, and/or acceleration of user 100 in room 500, predict the moment in time when user 100 is going to cross a selected boundary, and switch the configuration of array 401 concurrently or simultaneously with user 100 crossing that boundary.

As used, herein a "motion vector" is a two (or n) -dimensional vector used for an encoding, compression, and/or image manipulation that provides an offset in the coordinates of a picture or image with respect to the coordinates of a reference picture or image.

As an example, consider that video images provided from IHS 300 to xR headset 101 may be encoded, compressed, or otherwise manipulated prior to being transmitted over channel 205. For example, as part of this manipulation, a video frame or image may be divided into 16×16 pixel macroblocks. Each macroblock may contain 16×16 luminance pixels and 8×8 red/blue chrominance pixels. The luminance block is then split, for example, into four 8×8 blocks. This process results in six 8×8 blocks, upon which a discrete cosine transform (DCT) may be performed.

Still as part of the aforementioned encoding, compression, or manipulation, each macroblock may be matched to a 16×16 pixel region of a previous video frame or image. Once a suitable match is found, a "motion vector" (in this case, a vector pointing from the center of the macroblock to the center of the region that is the closest match) is assigned to that macroblock.

As used herein, examples of "motion vector data" include, but are not limited to, a first position of a macroblock in a first frame, a second position of the macroblock in a second frame, a time interval between the second frame and the first frame, and a distance between the second and first positions.

Figure 6A:
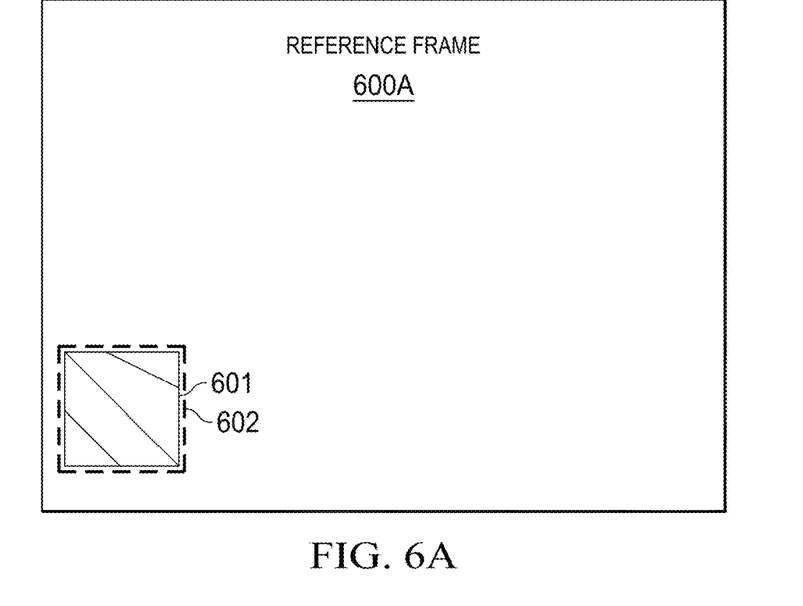
FIGS. 6A and 6B are graphs illustrating non-limiting examples of motion vector data according to some embodiments.
Figure 6B:
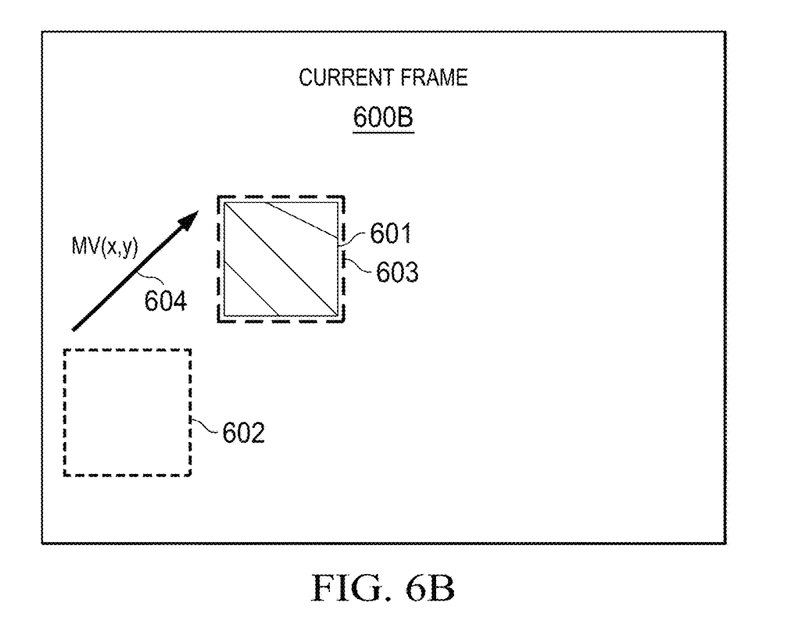

FIGS. 6A and 6B are graphs illustrating non-limiting examples of motion vector data according to some embodiments. As shown, a previously-displayed, reference image or video frame 600A includes macroblock 601A disposed in first position 602. The same or most closely matching macroblock 601 is found in subsequent frame 600B (e.g., immediately after frame 600A is displayed, or a number of frames afterwards), but now in second position 603. As such, the direction and magnitude of motion vector 604 may be obtained, indicating that the user's perspective has changed at a particular rate, in a discernible direction.

Additional motion vector data may be readily derived by a person of ordinary skill in the art, in light of this disclosure, based upon the aforementioned data such as, for example, a location, a direction of movement, a linear speed, an angular speed, a linear acceleration, or an angular acceleration of user 100.

Returning to FIG. 5, systems and methods described herein may increase the spatial coverage of antenna array 401, for instance, by turning individual antenna 410 on in response to user 100 moving towards, being about to reach, and/or crossing boundary 503, as determined based upon motion vector data that indicates the direction, speed, and/or acceleration of movement 501. Additionally or alternatively, individual antenna 414 may be turned off in response to the user moving towards, being about to reach, and/or crossing boundary 503.

Conversely, individual antenna 414 may be turned on in response to user 100 moving towards, being about to reach, and/or crossing boundary 504, as determined based upon motion vector data that indicates the direction, speed, and/or acceleration of movement 502. Additionally or alternatively, individual antenna 410 may be turned off in response to the user moving towards, being about to reach, and/or crossing boundary 504.

In many implementations, in addition to turning individual antennas on and off, the change of configuration may include increasing or decreasing an amplification of a signal received or transmitted by an individual antenna of antenna array 401 in response to the user moving towards, being about to reach, and/or crossing a selected boundary. Additionally or alternatively, the change of configuration may include the application of different beamforming settings to antenna array 401 to increase a signal strength between xR headset 101 and the IHS 300 in response to user 100 moving towards, being about to reach, and/or crossing a boundary.

In addition or as an alternative to increase spatial coverage, systems and methods described herein may change the configuration of communication channel 205 by switching between different communication protocols in response to the user moving towards, being about to reach, and/or crossing a selected boundary. For example, if a particular antenna configuration does not provide a sufficiently strong or high-data rate RF signal, the system may switch from a WiGig protocol to a WiFi protocol.

In some cases, as a fallback operation, the change of antenna configuration based upon motion vector data may be performed concurrently with or in response to a determination that a signal strength of communication channel 205 is above a threshold value. Additionally or alternatively, the change of the antenna configuration may be followed by a drop in a signal strength of the transmission of the xR content below a threshold value, in which case these systems and methods may return antenna array 401 to a previous configuration.

Figure 7:
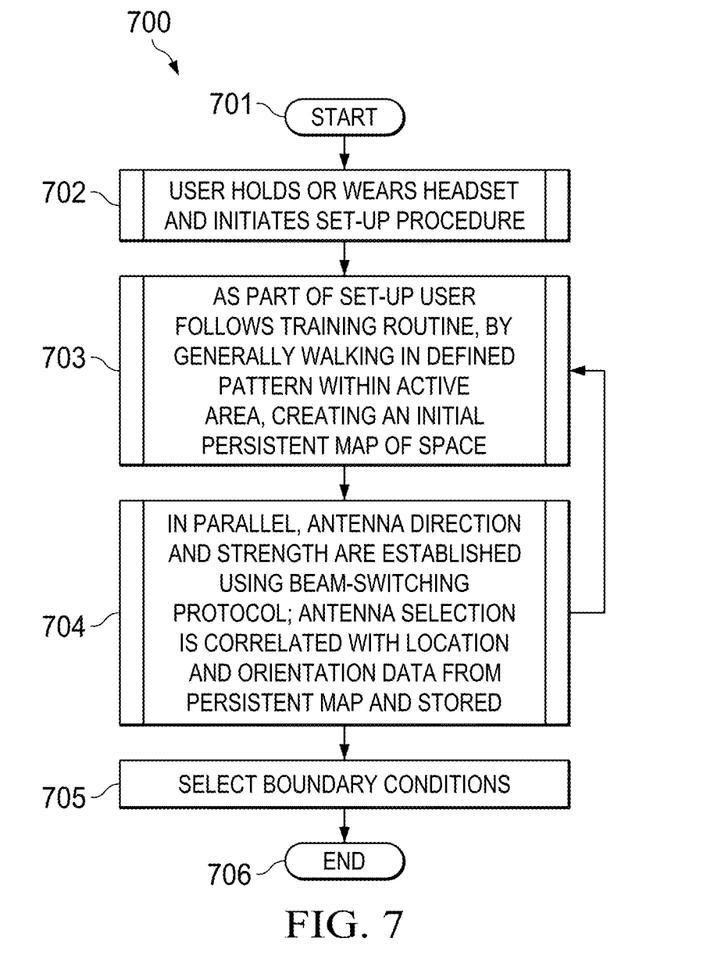
FIG. 7 is a flowchart of a non-limiting example of a method for correlating wireless communication settings with a user's location and/or movement according to some embodiments.

FIG. 7 is a flowchart of a non-limiting example of a method for correlating wireless communication settings with a user's location and/or movement. In some embodiments, method 700 may be performed as a training or mapping operation prior to normal execution of an xR application.

As shown method 700 begins at block 701. At block 702, user 100 holds or wears xR headset 101, and initiates a setup procedure with respect to IHS 300. As part of the setup, at block 703, user 100 follows a training routine by generally walking in a predefined pattern within an active area of room 500, therefore creating a persistent virtual map of the physical space.

At block 704 and in a loop with block 703 (e.g., executing in parallel), method 700 establishes the directionality and signal strength of antenna array 401 using a beam-switching protocol or technique. Antenna selection is correlated with location and orientation data from the persistent map and stored as an antenna characterization table.

At block 705, method 700 selects one or more boundary conditions. In some cases, boundary or trigger conditions may be automatically established based on the results of blocks 703 and 704 (e.g., stored in the antenna characterization table). In other cases, however, boundaries or triggers may be selected manually. Method 700 ends at block 706.

Still referring to method 700, it should be noted that xR mapping and tracking may be performed using different approaches. For example, with the "inside-out" approach, camera sensors and inertial sensors may be mounted on xR headset 101 to establish and maintain a persistent map of the active space (e.g., room 500), and simultaneously track the location and the orientation of xR headset 101 within that space. In the "outside-in" approach, standalone IR transmitter/receiver pairs (referred to as "lighthouses") establish a predefined physical activity space. These lighthouses track xR headset 101 within the defined space by transmitting or receiving signals to or from corresponding receives or transmitters on xR headset 101 (e.g., RF system 206).

Method 700 implements the "inside-out" approach to tracking, but it will be readily appreciated by a person of ordinary skill in the art in light of this disclosure that "outside-in" techniques may also be used.

Figure 8:
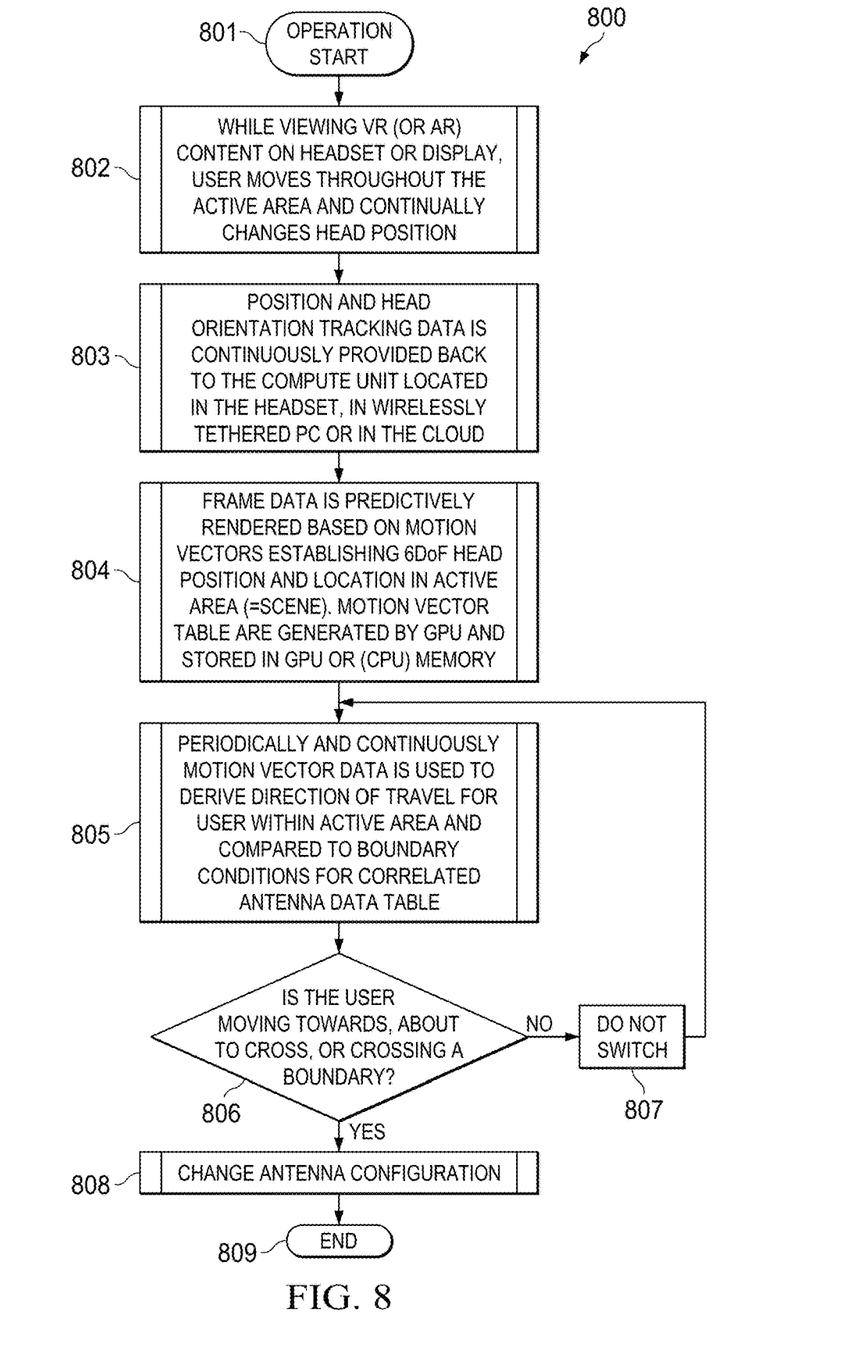
FIG. 8 is a flowchart of a non-limiting example of a method for configuring wireless communications using motion vector data according to some embodiments.

FIG. 8 is a flowchart of a non-limiting example of a method for configuring wireless communications using motion vector data. In some embodiments, method 800 may be performed upon completion of method 700 of FIG. 7.

Method 800 begins at block 801. At block 802, while viewing xR content on xR headset 101, user 100 moves through the active area (e.g., room 500) and continually changes head position. At block 803, position and head orientation tracking data is provided to a compute unit (e.g., controller 200 of headset 101, IHS 300, on the cloud, etc.).

At block 804, frame data is predictively rendered based on motion vector data establishing 6-degree of freedom (6DoF) head position and location in the active area (or scene). A motion vector table is generated (e.g., by GPU 307) and stored (e.g., in GPU or CPU memory). At block 805, periodically and/or continuously, motion vector data is used to derive the direction of travel of user 100 in room 500, and compared to the boundary conditions stored in the correlated antenna data table of method 700.

At block 806, method 800 determines, based upon the comparison of block 805, whether user 100 is moving towards, is about to reach, and/or is crossing boundary. If user 100 is not moving closer to any boundary, block 807 maintains the current configuration of antenna array 401, and control returns to block 805.

Conversely, if block 806 determines that user 100 is moving towards, is about to reach, and/or is crossing a given boundary, block 808 switches a configuration aspect of antenna array 401 (e.g., switching individual antennas or and off) following the antenna configuration table obtained using method 700. It should be noted that, in some cases, known methods for initiating, disassociating a previous antenna, associating a new antenna, etc. may be dependent on the protocol established between xR headset 101 and IHS 300. Method 800 ends at 809.

As shown in method 800, under normal operation, head orientation and location in the active area are continuously tracked through the use of camera and/or inertial units in xR headset 101 or in communication with an external lighthouse, as user 100 moves about room 500. Frame data provided to xR headset 101 (with the xR content) is predictively rendered based on that incoming tracking data.

GPU 307 or CPU 301 takes the latest arriving tracking data prior to transmission and adjusts frame view/perspective based on the user 100's most recent position. Body movement tracking is then used to determine the direction and speed of travel of user 100 relative to boundary conditions.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
    a processor; and
    a memory coupled to the processor, the memory having program instructions stored thereon that, upon execution by the processor, cause the IHS to:
        receive motion vector data representative of a direction of travel of a user wearing a virtual, augmented, or mixed reality (xR) headset; and
        change a configuration of an antenna based upon the motion vector data, wherein the antenna enables the IHS to wirelessly transmit xR content to the xR headset.

2. The IHS of claim 1, wherein the motion vector data includes a first position of a macroblock in a first frame, a second position of the macroblock in a second frame, a time interval between the second frame and the first frame, and a distance between the second and first positions.

3. The IHS of claim 2, wherein the first and second frames are obtained, at least in part, using a camera mounted on the xR headset, and wherein the macroblock is identified as a subset of pixels having a contrast above or below a threshold value.

4. The IHS of claim 1, wherein the motion vector data includes at least one of: a location, a direction of movement, a linear speed, an angular speed, a linear acceleration, or an angular acceleration of the user.

5. The IHS of claim 1, wherein the program instructions, upon execution, further cause the IHS to determine, using the motion vector data, that the user has reached a selected boundary within a room.

6. The IHS of claim 1, wherein the antenna is part of an antenna array.

7. The IHS of claim 6, wherein the antenna array is configured to provide a multi-gigabit per second speed wireless communication over a 60 GHz frequency band.

8. The IHS of claim 6, wherein the change of the configuration includes a change of a radiation pattern of the antenna array.

9. The IHS of claim 6, wherein the antenna array is configurable to provide a plurality of different radiation patterns, wherein each different radiation pattern has a distinct lobe configuration, and wherein the selected boundary is disposed between two neighboring lobes.

10. The IHS of claim 9, wherein the change of the configuration includes: turning a given antenna of the antenna array on in response to the user having reached the selected boundary, or turning the given antenna off in response to the user having reached the selected boundary.

11. The IHS of claim 9, wherein the change of the configuration includes increasing an amplification of a signal received or transmitted by an individual antenna of the antenna array in response to the user having reached the selected boundary.

12. The IHS of claim 9, wherein the change of the configuration includes application of different beamforming settings to the antenna array to increase a signal strength between the xR headset and the IHS in response to the user having reached the selected boundary.

13. The IHS of claim 9, wherein changing the configuration of the antenna includes changing a communication protocol between the IHS and the xR headset in response to the user having reached the selected boundary.

14. The IHS of claim 1, wherein the motion vector data is predictive of the direction of travel of the user, and wherein the change of the configuration is performed in anticipation of the user reaching the selected boundary.

15. The IHS of claim 1, wherein the change of the configuration is in response to another determination that a signal strength of the transmission of the xR content is above a threshold value.

16. The IHS of claim 1, wherein the program instructions, upon execution, further cause the IHS to:
 determine that the change of the configuration is followed by a drop in a signal strength of the transmission of the xR content below a threshold value; and
 return the antenna to a previous configuration.

17. A method, comprising:
 receiving data representative of a direction of travel of a user wearing a virtual, augmented, or mixed reality headset, wherein the data enables the headset, or an Information Handling System (IHS) in communication with the headset, to produce a graphical scene for display to the user; and
 change a configuration of an antenna based upon the data, wherein the antenna enables the IHS to maintain a wireless communication with the headset.

18. The method of claim 17, wherein the data includes at least one of: a first position of a macroblock in a first frame, a second position of the macroblock in a second frame, a time interval between the second frame and the first frame, or a distance between the second and first positions, wherein the antenna is part of an antenna array, wherein the antenna array is configurable to provide a plurality of different radiation patterns, wherein each different radiation pattern has a distinct lobe configuration, wherein a boundary is selected between two neighboring lobes, and wherein the change of the configuration includes application of different beamforming settings to the antenna array as the user moves with respect to the IHS.

19. A hardware memory storage device having program instructions stored thereon that, upon execution by a processor, cause the processor to:
 derive data representative of a direction of travel of a user wearing a virtual, augmented, or mixed reality headset, wherein the data enables the headset, or an Information Handling System (IHS) in communication with the headset, to produce a graphical scene for display to the user; and
 change a configuration of an antenna based upon the data, wherein the antenna enables the IHS to maintain a wireless communication with the headset.

20. The hardware memory storage device of claim 19, wherein the antenna is part of an antenna array, wherein the antenna array is configurable to provide a plurality of different radiation patterns, wherein each different radiation pattern has a distinct lobe configuration, wherein a boundary is selected between two neighboring lobes, and wherein the change of the configuration includes application of different beamforming settings to the antenna array as the user moves with respect to the IHS.

* * * * *